June 7, 1955 P. V. LARSEN 2,709,941
TWO-PART HOLDING KEYS
Filed June 23, 1951
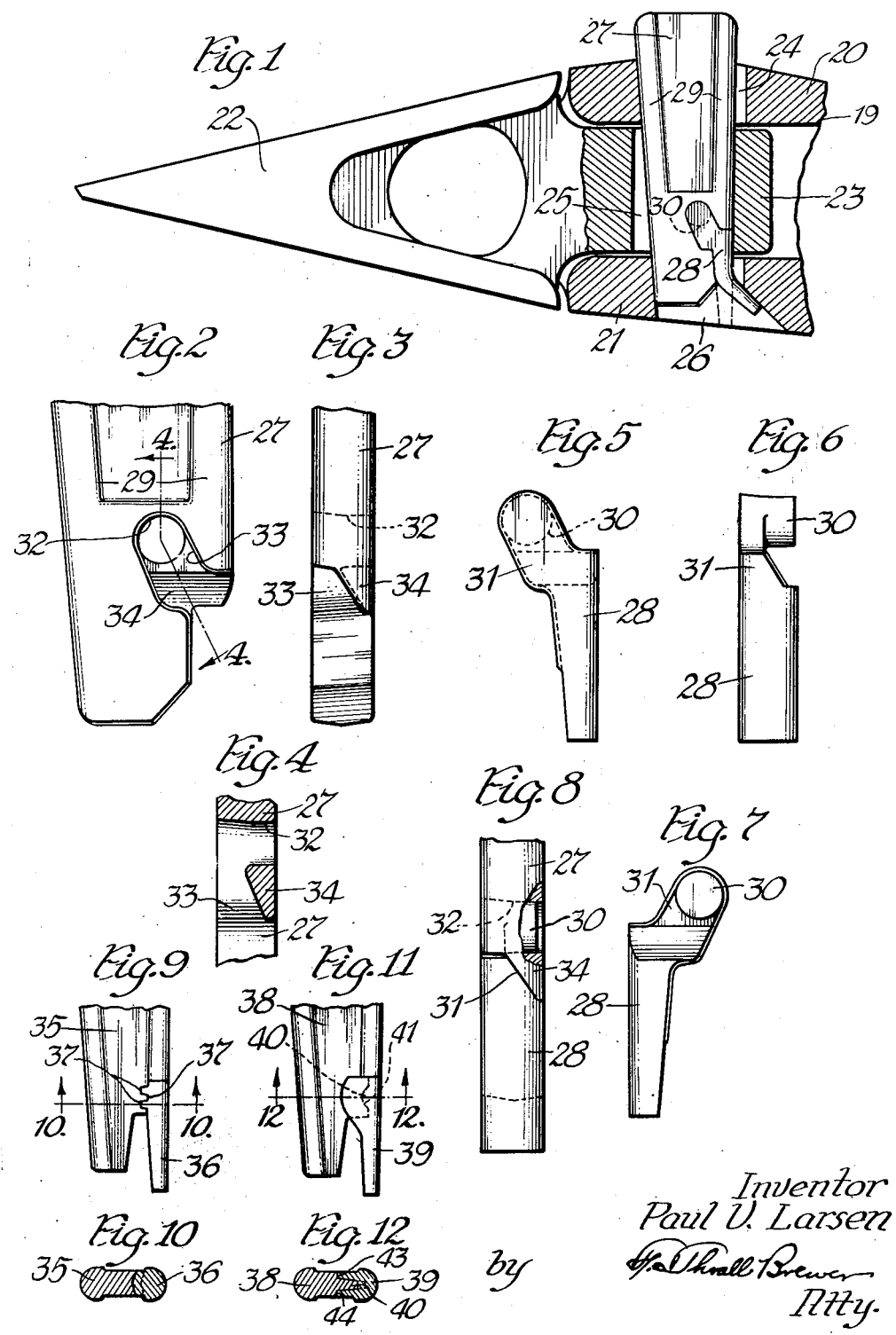
Inventor
Paul V. Larsen United States Patent Office 2,709,941
Patented June 7, 1955

2,709,941

TWO-PART HOLDING KEYS

Paul V. Larsen, Portland, Oreg., assignor to Electric Steel Foundry, Portland, Oreg., a corporation of Oregon Application June 23, 1951, Serial No. 233,233

3 Claims. (Cl. 85—8.1)

This invention relates to holding keys or pins for retaining cooperating parts of a structure in operative engagement with each other, and particularly to holding keys or pins which have wedging engagement with an adjacent portion of one or more of the parts to insure tight working connections between the several parts.

It is a general object of my invention to provide an improved key of the type referred to and which is adapted to use with heavy machinery, such as power shovel parts, for example, for maintaining the required connection between an auxiliary tooth support or the like on the body of a bucket or dipper and a tooth point which has contact with material being dug. Heavy wear on such teeth necessitates the use of exceedingly tough and relatively hard metal for the tooth points and in the elements by which the teeth are held in position. Because of the wear encountered by the tooth points, some means is preferably provided whereby they are readily detachable and replaceable so as to enable the substitution of new tooth points from time to time. For facilitating the removal and replacement of tooth points, keys by which the teeth are secured in position have been made with tangs projecting therefrom in position to be bent into holding engagement with a portion of the mounting structure, but such construction has not been entirely satisfactory. It has been impractical to temper the main portions of the keys to a satisfactory degree of hardness, while at the same time keeping the tangs soft enough to permit them to be bent repeatedly into and out of holding position. If the key, on the other hand, is not sufficiently hard, the wear thereon is excessive and its effectiveness for maintaining secure and tight mounting of a tooth point is appreciably lessened.

Another of the objects of my invention is to provide a holding key structure with which a comparatively soft and ductile tang is separably associated so as to constitute an operative part of a key of the required hardness which is adapted to effective use in holding a dipper tooth point or the like in its mounted position. For accomplishing this purpose, I have made the tang portion of the key as an element separate from the main body of the key and have provided releasable connections between the tang and the body which are so arranged that the tang is firmly held in position relative to the body by interfitting portions and by engagement of the tang with the wall of the socket in which the key is mounted, whereby the tang, when bent into holding engagement with the mounting structure, is effective for holding the key in position, and whereby the tang is held effectively in position relative to the key body.

Other objects and advantages will be apparent also from the following description of an exemplary embodiment of my invention which is disclosed for illustrative purposes by reference to the accompanying single sheet of drawings in which Fig. 1 is a side face view of a digger tooth assembly embodying a tooth point secured in position relative to an adapter by a preferred form of my holding key;

Fig. 2 is a fragmentary side face view of the lower end portion of the body portion of my improved key with the holding tang removed therefrom;

Fig. 3 is an edge view of the parts shown in Fig. 2, as viewed from the right in Fig. 2;

Fig. 4 is a fragmentary sectional view taken substantially at the line 4—4 in Fig. 2;

Fig. 5 is a front face view of my preferred tang which which is adapted to use with the key body shown in Figs. 2, 3 and 4;

Fig. 6 is a side view of the tang, as viewed from the right of Fig. 5;

Fig. 7 is a view of the tang as viewed from the face opposite that shown in Fig. 5;

Fig. 8 is an edge view of the lower portion of my improved key assembly wherein the body is viewed as in Fig. 5, and the tang is mounted in working position thereon;

Fig. 9 is a front face view of the lower end portion of a modified form of key embodying my invention;

Fig. 10 is a horizontal sectional view taken substantially at the line 10—10 in Fig. 9;

Fig. 11 is a view similar to Fig. 9 but showing a second modified form of my holding key; and Fig. 12 is a horizontal sectional view taken substantially at the line 12—12 in Fig. 11.

Referring now to Figs. 1 to 8 of the drawing, in which corresponding parts are indicated by the same reference characters, 20 and 21 indicate opposed wall portions of a tooth point adapter 19 of the type adapted to mounting on the base portion of a dipper or bucket used on power shovels and the like which adapter serves as support for tooth point 22 having a shank portion 23 disposed in a socket in such adapter between said opposed wall portions, so as to be held thereby. The wall portions 20 and 21 of the adapter and the shank portion 23 of the tooth point are provided with key receiving openings 24, 25 and 26 respectively which extend therethrough at positions such that they are aligned to receive therein a taper key 27 for securely and tightly holding the tooth point in place relative to the adapter. In the disclosed structure, the key is wedge-shaped and is adapted, by engagement with opposed walls of the openings in the tooth point and adapter, to hold the tooth 22 tightly and securely in position.

The key structure illustrated has a tang 28 extending longitudinally thereof and releasably secured in place relative to the key body, which tang is adapted to be bent into tight holding engagement with the adapter so as to normally hold the key tightly in place and prevent withdrawal thereof from the aligned openings. When withdrawal of the key is desired, for effecting removal of a tooth point from its adapter, the tang 28 is bent toward alignment with the key body and to the left, as shown in Fig. 1, from its holding position, as shown in solid lines, to a position, as depicted by dotted lines, for permitting the key to be driven from its holding position in the openings.

In my disclosed construction, in which the tang 28 is separate from the key 27, and is releasably secured in position thereon so as to permit the tang readily to be formed of soft ductile material capable of repeated bending, and the body of the key is made of tough and hardened metal, the tank and the key body are connected together by a lug on one of said parts, which engages a recess in the other of said parts; the construction being such that the two parts are held in operative relationship to each other when in use by their engagement with the walls of the openings in the adapter and the shank of the tooth point.

The key 27 is of substantially greater width than thickness. Also, the side marginal portions 29 at one end of the key are preferably of substantially greater thickness than the intermediate portion, so that such side marginal portions fit with relative snugness in the openings of the tooth point shank and adapter. These opposed marginal portions and side edges of the key are also rounded for enabling them to have properly centered position with respect to the openings which are correspondingly shaped. As shown in Figs. 1 and 2, the key is tapered from end to end in the direction of its greater width, so as to enable it readily to be driven into its final gripping position, thereby to force the shank of the tooth point into the adapter socket, and after which the tang 28 is bent into a position against the adapter wall, as shown by solid lines in Fig. 1, for holding the key securely in position.

As shown in Figs. 4, 6 and 8, a lug or mounting pin 30 extends laterally from one end of the tang 28 and is adjacent an arm portion 31 which is obliquely disposed and of varying thickness, so that the thickness of the tang increases in a direction away from the pin. As shown in Fig. 2, the body of the key is provided with an opening 32 of a shape and size to receive and fit the end of the tang and the pin 30, which opening is adjoined by a groove 33 which receives the obliquely disposed arm 31 therein. This construction serves to provide a substantially triangular bearing portion 34 in the key body with which the arm 31 of the tang is brought into contact, as shown in Fig. 4, with transverse support for the tang provided by the groove 33, whereby the holding tang 28 is held in place with respect to the key body 27.

With the body 27 of the key made of a tough and relatively hard metal, the key is highly effective for holding the tooth point 22 in position and for resisting wear resulting from the use to which the tooth point is subjected. If the tang 28 is also made of hard metal, it may nevertheless be capable of being given a single initial bend into holding engagement with the tooth point adapter for holding the key and the tooth point 22 effectively in position. If the removable tang of my disclosed key structure is broken in an attempt to bend it in either direction, it is a comparatively simple matter to substitute a new tang, and then the key in position. If, however, the tang is made of comparatively soft ductile metal, as I prefer, it can be bent backwardly and forwardly a considerable number of times, in most instances, before it is necessary to replace it. For securing the best and most dependable service, I prefer to use a soft ductile metal for the tang, and to use a new tang each time a tooth point is replaced.

In the modified structure illustrated in Figs. 9 and 10, a taper key body 35 is made of hard metal and is provided with a separately formed tang 36, which tang is made of a comparatively soft and ductile metal; the tang being releasably connected to the key body at one edge thereof by interengaging teeth 37 which secure the tang against movement longitudinally of the key body, while permitting ready detachment thereof from the key body when the key is not in the openings of a tooth point and its adapter. The construction is such that the tang is held firmly in position on the key body, so as to be immovable with respect thereto when the key is installed in holding position in the openings of the tooth point and adapter, as shown in Fig. 1 in respect to the key 27.

The modified structure depicted in Figs. 11 and 12, embodies another type of connection for retaining a taper key 38 of hardened metal and a separable tang 39 of ductile metal in their relative and operable positions with respect to one another. In this construction, the tang 39 has a channel or groove 41 extending longitudinally along one side of an end portion of the tang and embracing a tongue 40 at one side of the key body. The groove and its coacting tongue are preferably somewhat wedge shaped, and the key body has shoulders 43 and 44 adjacent the tongue and contoured to fit the end and side surface portions of the tang for locating and retaining purposes.

From the foregoing description, it may readily be understood that I have provided a key structure wherein the wear resisting part is hard, so as to withstand such wear, and the deformable part is readily susceptible to the required deformation. Furthermore, the separable parts interfit to hold them together for installation and are easily replaceable.

While I have illustrated a preferred embodiment of my invention, modifications may be made therein without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A key for holding two elements having aligned openings therein together by the insertion of said key therethrough, said key having retaining means adjacent each end thereof for retaining the key against dislodgement by restraining the longitudinal movement thereof when disposed within said openings, said key having a relieved surface portion extending substantially longitudinally from one of said ends, an aperture disposed totally within said key and opening only into portions of said key other than said relieved surface portion with the longitudinal axis of the aperture being in a plane substantially parallel to the longitudinal axis of the key and the relieved surface portion, the said retaining means adjacent said relieved key end comprising a separate member carried by said key on the relieved surface, said member comprising a key locking portion on one end thereof including a deformable tang extending beyond the adjacent relieved surface portion of said key constituting an extension thereof, a position securing portion on the other end of said member including a pin extending substantially transverse to and offset from said locking portion and received in said aperture to secure said member in a desired position on said key during the insertion thereof into said aligned openings and an offset portion connecting said locking and position securing portions together.

2. The structure defined in claim 1, wherein said key has a groove connecting the aperture and the relieved surface portion in said key, said groove being of a depth and shape corresponding to the thickness and shape of said offset connecting portion of said member such that the outer surface of said member constitutes an extension of the adjoining surfaces of the key.

3. The structure defined in claim 1, wherein said retaining means on the other end of said key comprises an elongated and longitudinally tapered key body providing a working fit and restraining the key against movement in a longitudinal direction opposite the restraining action of said separate member when said key is disposed in said openings.

References Cited in the file of this patent

UNITED STATES PATENTS

| | | |
|---|---|---|
| 664,027 | O'Meara | Dec. 18, 1900 |
| 925,189 | Hoover | June 15, 1909 |
| 1,780,397 | McKee et al. | Nov. 4, 1930 |
| 2,055,265 | Swigert, Jr. | Sept. 22, 1936 |
| 2,064,059 | Fellmeth | Dec. 15, 1936 |
| 2,242,793 | Philbrick | May 20, 1941 |
| 2,292,128 | King | Aug. 4, 1942 |